US010683241B2

(12) United States Patent
Arioli et al.

(10) Patent No.: US 10,683,241 B2
(45) Date of Patent: Jun. 16, 2020

(54) AQUEOUS SEAWEED EXTRACT IN THE FORM OF A SOLUTION CONCENTRATE

(71) Applicant: SEASOL INTERNATIONAL PTY LTD, Bayswater, Victoria (AU)

(72) Inventors: Tony Arioli, Ashwood (AU); Peter Neville-Jones, Camberwell (AU)

(73) Assignee: SEASOL INTERNATIONAL PTY LTD, Bayswater, Victoria (AU)

(*) Notice: Subject to any disclaimer, the term of this patent is extended or adjusted under 35 U.S.C. 154(b) by 0 days.

(21) Appl. No.: 15/304,502

(22) PCT Filed: Jul. 9, 2015

(86) PCT No.: PCT/AU2015/000404
§ 371 (c)(1),
(2) Date: Oct. 14, 2016

(87) PCT Pub. No.: WO2016/007987
PCT Pub. Date: Jan. 21, 2016

(65) Prior Publication Data
US 2017/0121234 A1    May 4, 2017

(30) Foreign Application Priority Data

Jul. 15, 2014  (AU) ................. 2014902728
Jun. 1, 2015   (AU) ................. 2015902033

(51) Int. Cl.
| | | |
|---|---|---|
| *C05D 3/00* | (2006.01) | |
| *C05G 3/00* | (2020.01) | |
| *C05G 3/02* | (2006.01) | |
| *C05C 5/04* | (2006.01) | |
| *A01N 63/00* | (2020.01) | |
| *A01N 63/02* | (2006.01) | |
| *C05F 11/00* | (2006.01) | |
| *C05B 7/00* | (2006.01) | |
| *C05F 11/08* | (2006.01) | |
| *A01N 63/10* | (2020.01) | |
| *C05G 3/60* | (2020.01) | |
| *C05G 5/23* | (2020.01) | |

(52) U.S. Cl.
CPC ............... *C05D 3/00* (2013.01); *A01N 63/00* (2013.01); *A01N 63/10* (2020.01); *C05B 7/00* (2013.01); *C05C 5/04* (2013.01); *C05F 11/00* (2013.01); *C05F 11/08* (2013.01); *C05G 3/60* (2020.02); *C05G 5/23* (2020.02)

(58) Field of Classification Search
None
See application file for complete search history.

(56) References Cited

U.S. PATENT DOCUMENTS

| | | | | |
|---|---|---|---|---|
| 5,876,479 A | * | 3/1999 | Hedgpeth, IV | .......... C05D 3/02 71/11 |
| 2006/0084573 A1 | | 4/2006 | Nigel et al. | |
| 2012/0021911 A1 | | 1/2012 | Majure et al. | |
| 2012/0103041 A1 | * | 5/2012 | Smith | ..................... C05B 17/00 71/27 |
| 2014/0041430 A1 | | 2/2014 | Kuo et al. | |

FOREIGN PATENT DOCUMENTS

| | | | |
|---|---|---|---|
| CN | 102391042 A | | 3/2012 |
| CN | 102924139 A | * | 2/2013 |
| CN | 103030460 A | | 4/2013 |
| CN | 103058750 A | * | 4/2013 |
| CN | 103351231 A | * | 10/2013 |
| CN | 103525428 A | | 1/2014 |
| WO | 2009151677 A2 | | 12/2009 |

OTHER PUBLICATIONS

UF/IFAS extension (http://hillsborough.ifas.ufl.edu/residential_lg/FAQs/fertilizer_pH.shtml#Q4, cached Dec. 9, 2013) no pagination.*
galleries.com entry on Borax (https://web.archive.org/web/20111115011715/http://www.galleries.com/Borax, cached Nov. 15, 2011) no pagination.*
Kumar, N. A.; et a. "Effect of liquid seaweed fertilizer of Sargassum wightii grev. on the growth and biochemical content of green gram (*Vigna radiata* (L.) R. wilczek)" Recent Research in Science and Technology, 2012, 4(4), 40-45. (Year: 2012).*
Immanuel, G; et al. "Sodium alginate from Sargassum wightii retards mortalities in Penaeus monodon postlarvae challenged with white spot syndrome virus" Diseases of Aquatic Organisms, 2012, v. 99, 187-196 (Year: 2012).*
Kobaslija, Muris; McQuade, D. T. "Removable colored coatings based on calcium alginate hydrogels" Biomacromolecules, 2006, 7, 2357-2361. (Year: 2006).*
FAO "Seaweeds used as a source of Alginate" http://www.fao.org/3/y4765e/y4765e07.htm, no pagination, no date available.*
Powerfeed (https://www.seasol.com.au/images/assets/PDFs/powerfeed_analysis_august_2002.pdf) (Year: 2002).*
Shaman (http://www.shaman-australis.com/forum/index.php?/topic/36414-seasol-question/,entries dated 2013) (Year: 2013).*
Seasol cached FAQ page (https://web.archive.org/web/20130409013741/http://seasol.com.au/index.php?option=com_content&view=article&id=29&Itemid=118) (Year: 2013).*
Seasol commercial product analysis (https://fernland.com.au/media//esync/c6ad808d648910ff850ac9f0246d5a7a/Label%20-%20Seasol%20Commercial.pdf) no date but was commercially available in 2009 as per Khan.*

(Continued)

*Primary Examiner* — Erin E Hirt
(74) *Attorney, Agent, or Firm* — Pepper Hamilton LLP (57) ABSTRACT

There is provided an aqueous seaweed extract in the form of a solution concentrate composition comprising: (a) at least 0.5% by weight soluble alginate based on the weight of concentrate composition; (b) at least 0.1% calcium by weight based on the weight of concentrate composition; (c) a calcium-chelating agent; and (d) a borate compound.

16 Claims, 1 Drawing Sheet

(56) References Cited

OTHER PUBLICATIONS

Khan et al. (J. Plant Growth Reg., 2009, 28, 386-399) (Year: 2009).*
McHugh et al., "A Guide to the Seaweed Industry," FAO Fisheries Technical Paper, FAO Corporate Document Repository, 441, 27-49 (2003).
Agritopic, "Ammonium Nitrate Fertilisers, Cal-Am, Cal-Gran," pp. 1-11 (2010) (retrieved on Jul. 31, 2015).
Adipogen, "Safety Data Sheet According to 1907/2006/EC, Article 31, Fulvic acid," (2013) (retrieved on Aug. 3, 2015).
PCT International Search Report and Written Opinion for corresponding PCT/AU2015/000404 (dated Aug. 7, 2015).
Extended European Search Report and Opinion for European Patent Application No. 15822249.7 (dated Mar. 2, 2018).
Thomson Scientific, London, GB; XP002778429 (Apr. 10, 2013) (abstract only).
Thomson Scientific, London, GB; XP002778145 (Apr. 23, 1996) (abstract only).
Thomson Scientific, London, GB; XP002778146 (Apr. 23, 1991) (abstract only).

* cited by examiner

AQUEOUS SEAWEED EXTRACT IN THE FORM OF A SOLUTION CONCENTRATE

This application is a national stage application under 35 U.S.C. § 371 of PCT Application No. PCT/AU2015/000404, filed Jul. 9, 2015, which claims priority of Australia Application Nos. 2015902033, filed Jun. 1, 2015, and 2014902728, filed Jul. 15, 2014.

FIELD

This invention relates to a liquid seaweed extract in concentrated form comprising alginate and calcium ions, to methods of preparing such concentrates and to their use in agriculture particularly as a biostimulant, fertiliser and/or soil conditioner.

BACKGROUND

Seaweed has been used as a fertiliser and soil conditioner for many years. Seaweed has been used in milled or finely divided form and in the form of a liquid extract. In general liquid extracts are preferred as they may be purchased as an aqueous concentrate, readily diluted to the required concentration and applied using agricultural spray equipment.

Seaweed extracts have been shown to increase crop yields, resistance of plants to frost, uptake of inorganic soil nutrients, resistance to environmental stress conditions, resistance to some pests such as red spider mite and aphids and to reduce fruit losses during storage. Seaweed extracts improve the root system of plants and increase their reproductive capacity, increasing the number of flowers per plant as well as the number of flowers per flowering season.

Seaweed species are grouped into red, green and brown seaweeds. The species used to produce extracts varies throughout the world. Most commercially available seaweed fertilisers, also called biostimulants, are made from brown seaweeds. Brown seaweeds are more prevalent in cold water regions of the world. In Australia, seaweed fertiliser products are mostly manufactured from alginate rich Bull Kelp or a blend with other seaweed.

Seaweed species vary in the amount of alginate present. The extraction process may also have a bearing on the amount and structure of alginate in the extract prepared from the seaweed. Alginates are important compounds in providing the soil conditioning properties of seaweed fertilisers and hence their presence in seaweed extracts is regarded as beneficial.

The presence of alginate has however placed severe limitations on the use of other plant nutrients with seaweed extracts and in particular the use of calcium salts with seaweed extract.

Calcium is widely recognized for its important function in plants to increase nutrient uptake, build strong cell walls for sturdier plants and increase vitality. Maintaining high levels of bio-available calcium in soil is critical in achieving adequate levels of calcium uptake. Calcium plays a very important role in plant growth and nutrition, as well as in cell wall deposition. The primary roles of calcium as a soil amendment are to help maintain chemical balance in the soil, reduce soil salinity, and improve water penetration. Calcium also plays a critical metabolic role in carbohydrate removal and neutralizing cell acids. It is important to note that even though many soils contain high levels of insoluble calcium such as calcium carbonate, crops grown in these soils will often show symptoms of a calcium deficiency. Calcium also has roles in mitigating plant stresses such as cold and heat.

Balancing the requirement of high biostimulant efficacy with high levels of calcium and alginate content in the seaweed extract is a problem. When seaweed extract containing alginate is combined with calcium salts an insoluble gel is formed which produces residues which may interrupt, block and interfere with agricultural equipment such as spraying and irrigation equipment. The presence of the gel residue also gives rise to poor product stability which is exacerbated in cold weather conditions. Importantly, the unwanted gel residue is not reversible in nature. Consumers also find the presence of gels unattractive and there is a significant risk that a non-homogeneous composition will result in under-dosing of the components or a loss of a portion of the composition through failure to adequately disperse solids prior to dosing.

Previous attempts to address this problem have lead to the use of separate seaweed and calcium fertiliser components which are combined in very dilute compositions prior to spraying. The potential problems are minimised by contact of calcium and alginate species only in very dilute compositions, such as when concentrates are diluted by, for example, dispersing one part by volume of concentrate in 200 parts by volume of water. This need to combine different materials adds to the cost of transport and handling of different compositions and also relies on appropriate dosing at the point of use. Others have obviated the problem by preparing solid particulate fertilisers which can be broadcast as solid fertilisers. This, however, loses the benefit of spray application which is a significant benefit of liquid seaweed extracts, furthermore when plants have a calcium deficiency, rapid uptake approaches such as foliar application mandate a liquid product. These types of deficiencies are inefficiently addressed via a slow release solid form product.

One example of a seaweed extract containing a calcium additive is disclosed in EP0884293 which teaches a combination of at least one natural or synthetic aminopurine derivative or an algal extract rich in such derivatives, and a source of calcium as an agent for stimulating the germination process and the development of the plant production structures. The sources of calcium may include limestone, calcium chloride and calcium salts of amino acids. This patent also teaches that aminopurine-rich extracts were obtained by extraction at pH 3 with sulphuric acid. The end-product (see Example 3 of EP0884293) is typically a solid.

A further example of a solid composition of a seaweed extract containing calcium is disclosed in EP 2268594. A water-soluble fertiliser suspension with calcium, soluble seaweed, and fulvic acid is processed into a solid powder form together with magnesium and phosphate in defined ranges.

The present inventors have examined the use of calcium chelation agents such as EDTA, fulvic acid, and amino acids in attempt to reduce the problem of gel formation on combining a liquid seaweed extract concentrate with a calcium source. Such strategies do not, however, lead to satisfactory liquid products when the liquid concentrate contains significant levels of alginate based on the weight of the concentrate composition.

It is desirable to have a one-pack liquid seaweed extract concentrate such as extract derived from one or more of Bull Kelp (*Durvillae potatorum*), Knotted Kelp (*Ascophyllum nosodum*) and *Durvillae* species *D. antarctica* that also contain calcium ions.

SUMMARY

There is provided an aqueous seaweed extract in the form of a solution concentrate composition comprising:
(a) at least 0.5% by weight soluble alginate based on the weight of concentrate composition;
(b) at least 0.1% calcium by weight based on the weight of concentrate composition;
(c) a calcium-chelating agent; and
(d) a borate compound.

There is further provided a method of preparing an aqueous seaweed extract in the form of a solution concentrate as described above, the method comprising:
(a) extracting a seaweed to provide a seaweed extract comprising alginate in an amount of at least 0.5% w/w of the concentrate composition;
(b) combining the extract with a calcium source in the presence of a calcium chelating agent and a borate compound to provide least 0.1% by weight calcium based of the weight of the concentrate composition.

There is thus further provided a method of fertilising plants comprising:
providing a liquid seaweed extract concentrate as herein described;
optionally diluting the seaweed extract concentrate; and
applying liquid seaweed extract to the plants or locus of the plants before, during or after planting.

The liquid seaweed extract may be applied in an amount to provide one or more benefit selected from the group consisting of enhanced plant growth, reduced plant stress and improved soil.

Throughout the description and claims of the specification, the word "comprise" and variations of the word, such as "comprising" and "comprises", is not intended to exclude other additives, components, integers or steps.

The term emulsion is used hereon to refer to a fine dispersion of minute droplets of one liquid in another in which it is not soluble. The composition may, for example, comprise an emulsified water immiscible phase. The term emulsion includes macro-emulsions and micro-emulsions.

The term "plant (or plants)" is a synonym of the term "crop" and is to be understood to include a plant of economic or aesthetic importance. The term "plant" as used herein includes all parts of a plant such as seed, leaves, roots, flowers, fruits, germinating seed, seedlings, cuttings, herbaceous vegetation as well as established woody plants including all belowground portions (such as the roots and tubers) and associated soil microbes, aboveground portions, plant endophytes and plant epiphytes.

The seaweed extract concentrate composition is a plant biostimulant. The term "biostimulant" in this context refers to materials, with the exception of synthetic nutrients and pesticides, which when applied to plants, have the capacity to modify physiological processes of plants in a way that provides potential benefits to growth, development and/or stress response.

DETAILED DESCRIPTION

The composition of the invention is in the form of a solution concentrate of seaweed extract and contains alginate and calcium ions despite the difficulties previously reported in obtaining such compositions due to the formation of insoluble gel formed from the reaction of soluble calcium ions and alginate. The composition is stabilised against formation of insoluble gels by the presence of a combination of calcium chelating agent and borate. While the composition comprises a solution concentrate of seaweed extract it may additionally comprise dispersions of one or more of solids and water immiscible liquids such as in the form of an emulsion, micellar solution or swollen micelles.

The concentrate composition and process involve a liquid seaweed extract. Suitable liquid seaweed extracts are commercially available and may be obtained commercially or prepared by extraction of suitable alginate containing seaweeds. Seaweed species are generally grouped into red, green and brown seaweeds. Although seaweed extracts from any of the general types containing alginates may be used the composition is particularly suited to brown seaweed and its extracts. Extracts of the brown seaweed (orders, families and genera in the class Phaeophyceae) are particularly suitable to the preparation of seaweed fertilisers and bio-stimulants and include *Ascophyllum, Durvillaea, Ecklonia, Laminaria, Lessonia, Macrocystis, Fucus* and *Sagassum*. Specific examples of brown seaweeds include Bull Kelp (*Durvillae potatorum*), *Durvillae* species *D. antarctica* and Knotted Kelp (*Ascophyllum nosodum*) which have high levels of alginate.

The solution concentrate may comprise a wide concentration range of dissolved solids depending on the seaweed extraction method, the type of seaweed and the materials including calcium salts, borate and any other materials which are added. In one set of embodiments the solution concentrate composition comprises at least 5% w/w dissolved solids and more preferable at least 10% w/w dissolved solids by weight of the solution concentrate composition. The total dissolved solids is generally no more than 60% w/w, preferably no more than 50% w/w such as no more than 40% w/w or no more than 30% w/w.

In one set of embodiments the seaweed extract on a dry weight basis constitutes at least 20% w/w of the dry weight of the total solution concentrate with components not derived from the seaweed constituting the balance. More preferably the seaweed extract will comprise at least 50% w/w (dry weight) and still more preferably at least 80% w/w (dry weight) based on the dry weight of the solution concentrate composition. The dry weight amount of seaweed extract may preferably be no more than 99% w/w such as no more than 95% w/w seaweed extract dry weight based on the total dry weight of the solution concentrate.

Alginate, also called algin or alginic acid, is an anionic polysaccharide distributed widely in the cell walls of seaweed, particularly brown seaweed. In extracted form it absorbs water quickly; it is capable of absorbing 200-300 times its own weight in water. Alginate is a linear copolymer with homopolymeric blocks of (1-4)-linked β-D-mannuronate (M) and its C-5 epimer α-L-guluronate (G) residues, respectively, covalently linked together in different sequences or blocks.

The monomers can appear in homopolymeric blocks of consecutive G-residues (G-blocks), consecutive M-residues (M-blocks) or alternating M and G-residues (MG-blocks). The alginate is generally derived from the seaweed extract but if desired additional alginate may be added such as sodium alginate to supplement the seaweed extract content of alginate. The alginate (determined as alginic acid equivalent) is present in the composition in an amount of at least 0.5% by weight based on the weight of the solution concentrate composition. In the case of extract from brown seaweed the content is generally at least 2% by weight of the weight of the concentrate composition, more preferably at least 5% w/w based on the weight of the concentrate composition. Many of the available seaweed extracts comprise up to 25% by weight alginate based on the weight of the concentrate composition and generally we have found the composition to be particularly useful in agricultural applications with an alginate content (determined as alginic acid equivalent) in the range of from 8% to 25% by weight, more preferably 8% to 20% by weight, based on the weight of the concentrate composition.

There is provided, in one set of embodiments, an aqueous seaweed extract in the form of a solution concentrate composition comprising:

(a) at least 0.5% by weight soluble alginate based on the weight of concentrate composition;
(b) at least 0.1% calcium by weight based on the weight of concentrate composition;
(c) a calcium-chelating agent (preferably at least 0.1% by weight as calcium based on the weight of concentrate composition); and
(d) a borate compound (0.01% by weight as boron based on the weight of concentrate composition).

The composition comprises dissolved calcium ions which may be derived from soluble calcium salts. The calcium may be added as a salt of the chelating agent or alternatively a calcium salt, particularly a water soluble calcium salt, may be used. The nature of the calcium salt used in adding calcium to the composition is not narrowly critical provided the salt is soluble and does not adversely interfere with the composition or cause plant injury. Typical examples of calcium salts include calcium nitrate (which also provides a nitrogen source), calcium chloride, calcium fulvate and calcium gluconate. The calcium salts with at least one of nitrate, chloride and gluconate counterions are particularly preferred. The calcium may be present in an amount of at least 0.1%, preferably from 0.1% to 5%, such as 0.2% to 4%, 0.3% to 4% or 0.4% to 3% by weight based on the weight of the concentrate composition. In one set of embodiments the calcium is present in an amount of no more than 3% such as no more than 1% by weight based on the weight of the concentrate composition.

The composition comprises borate. Borate compounds which may be used in the compositions of the present invention are boric acid and other agrochemically acceptable salts such as sodium borate (borax) and potassium borate. Borates include a range of boron-containing oxyanions. The term "borates" includes chemical compounds which contain borate anions. Larger borates are composed of trigonal planar $BO_3$ or tetrahedral $BO_4$ structural units, joined together via shared oxygen atoms and may be cyclic or linear in structure. Borates may be used or present in a range of hydrated forms and the process and composition may utilize any suitable form of at least one borate compound.

In one set of embodiments the borate compound comprises at least one selected from the group consisting of trialkyl borates, perborates, borax decahydrate, borax pentahydrate and boric acid.

The borate is present in an amount to reduce gel formation or preferably stabilize the composition against gel formation in the presence of the calcium cation. The borate concentration will thus depend on the concentration of calcium ion, alginate and the chelating agent. In one set of embodiments the borate is present in an amount in the range of from 0.02 to 10% preferably 0.02 to 5% by weight (as boron equivalent) based on the weight of the concentrate composition and more preferably present in an amount in the range of from 0.02 to 0.5% by weight (as boron equivalent) based on the weight of the concentrate composition. In one set of embodiments the weight ratio of borate (as boron) to calcium is in the range of from 1:1 to 1:25 and more preferably from 1:3 to 1:15. In the specification and claims the reference to borate determined as boron or as boron equivalent means that the weight or weight percent of the borate component is reported in terms of only the boron content of the borate and not including the total borate which includes oxyanions and may include hydrates and or counterions.

Examples of forms of borax include anhydrous borax ($Na_2B_4O_7$), borax pentahydrate ($Na_2B_4O_7.5H_2O$), Borax decahydrate ($Na_2B_4O_7.10H_2O$) and $Na_2[B_4O_5(OH)_4].8H_2O$. In one set of embodiments the borate compound is borax (as pentahydrate or decahydrate), and the concentration of borax is at least 0.5% by weight which corresponds to about 0.05% by weight as boron based on the weight of the concentrate composition.

The term chelating agent refers to an agent which provides chelation of calcium. According to the International Union of Pure and Applied Chemistry (IUPAC) chelation involves the formation or presence of two or more separate coordinate bonds between a polydentate (multiple bonded) ligand and a single central atom which in the present context is calcium. Usually these ligands are organic compounds, and are also called chelants, chelators or sequestering agents. A wide range of chelating agents for calcium are known in the art and a skilled person will be able to select a suitable chelating agent without undue experimentation. The calcium chelating agent content will depend in part on the calcium concentration and the borate concentration. In one set of embodiments the amount of calcium chelating agent is present in an amount in the range of from 0.1% to 8% by weight based on the weight of the concentrate composition. Preferably the calcium chelating agent is present in an amount in the range of from 0.5% to 5% w/w of the concentrate composition. In one set of embodiments the molar ratio of chelating agent:calcium is in the range of from 12:1 to 1:4 an preferably 4:1 to 1:4.

Specific examples of calcium chelating agent include gluconodeltalactone (GDL), gluconic acid, ethylenediaminetetraacetic acid (EDTA), carboxy-functional sugars, amino acids, fulvic acid, humic acids, ethylene glycol tetraacetic acid (EGTA), cyclohexyldiaminetetraacetic acid (CDTA), diethylenetriamine pentaacetic acid (DTPA), nitrilotriacetic acid (NTA), N-(hydroxyethyl)-ethylenediaminetriacetic acid (HEDTA), (N-(1,2-dicarboxyethyl)-D,L-aspartic acid (IDS), DS (polyaspartic acid), EDDS (ethylenediamine-N,N'-disuccinic acid), GLDA (N,N-bis (carboxymethyl)glutamic acid) and MGDA (methylglycinediacetic acid). The chelating agent may be added in the form of the acid or water soluble salt. It may be used in the form of the calcium salt with the chelated calcium providing at least portion of the calcium content of the concentrate composition. In a particularly preferred set of embodiments the calcium chelating agent is GDL and the weight ratio of GDL to calcium is at least 2, preferably at least 2.5 such as in the range 2.5 to 4.

The composition is an aqueous solution of the seaweed extract. In one set of embodiments the aqueous solution concentrate comprises at least 40% w/w water, preferably at least 60% w/w water and more preferably at least 70% w/w water. The composition may comprise up to 95% w/w water but in the preferred embodiments the composition comprises up to 90% w/w water such as up to 85% w/w water.

In one set of embodiments the seaweed extract solution concentrate composition comprises:

(a) alginate in an amount in the range of from 5% to 25%, preferably 3% to 20%, more preferably 5% to 20%, by weight of the weight of the concentrate composition;

(b) calcium in an amount of from 0.1% to 5%, preferably 0.1% to 4%, more preferably 0.2% to 2%, by weight of the weight of the concentrate composition;
(c) borate in an amount in the range of from 0.02 to 10%, preferably 0.02% to 5%, more preferably 0.02 to 0.5%, still more preferably 0.03% to 2%, by weight (as boron equivalent) of the weight of the concentrate composition;
(d) calcium chelating agent in the range of from 0.1% to 8%, preferably 0.1% to 5%, more preferably 0.3 to 5%, by weight of the weight of the concentrate composition; and
(e) water in an amount of from 60% to 95% w/w of the concentrate composition, preferably 70% to 90% w/w of the concentrate composition.

In a preferred aspect of this set embodiments the molar ratio of chelating agent:calcium is in the range of from 12:1 to 1:12 more preferably 4:1 to 1:4.

The composition may be prepared with a wide range of pH values depending on the method used for preparing the extract and/or pH adjustment following extraction. In one set of embodiments the pH of the solution concentrate is in the range of from 7 to 12.5 and preferably in this embodiment the pH is from 9.0 to 11.5. The pH the liquid composition may be provided by an alkalising agent such as an alkanolamine or a metal hydroxide.

The solution concentrate may comprise further materials such as one or more selected from the group consisting of plant nutrients, pesticides, plant safeners, plant growth regulators, plant defence elicitors, soil enhancers, microbial nutrients, and beneficial biologicals, or parts, such as microbes.

In one set of embodiments the composition comprises additional fertiliser components (which may be soluble and/or insoluble) such as at least one selected from the group of additional nitrogen, phosphorus and potassium. Examples of such supplements may include urea, nitrates, potassium salts, magnesium salts, selenium salts and other micronutrients.

The composition of the invention may include a source of phosphorus. Seaweed concentrates comprising additional phosphorus are frequently difficult to provide because of the formation of insoluble calcium phosphate species. Useful phosphorous compounds which may be included in compositions of the invention include, but are not limited to, phosphates (as trivalent anion), monohydrogen phosphates (as divalent anion), dihydrogen phosphates (as monovalent anion), phosphoric acid, hypophosphite, and phosphate adducts such as urea phosphate. The total phosphate (determined as phosphate and not including counter ion) is preferably in the range of from 0.5% to 10% by weight, preferably from 1% to 10% and more preferably 3.5% to 7% by weight, based on the weight of the seaweed extract.

Accordingly in one set of embodiments, the concentrate compositions further comprise one or more phosphorous compounds, such as phosphorus compounds selected from the group consisting of phosphates, dihydrogen phosphates, monohydrogen phosphates, dihydrogen phosphates, phosphoric acid, hypophosphates, polyphosphates, and phosphates adducts such as urea phosphates. Particularly preferred phosphates include monohydrogen phosphates, hypophosphates, mono ammonium phosphate and mixtures thereof, still more preferably the phosphorus compound is mono ammonium phosphate. In one preferred set of embodiments the concentrate composition comprises at least one phosphorous compound and the pH is in the range 9 to 12.5, preferably pH10 to pH11.

The solution concentrate may comprise active agents selected from the group consisting of herbicides, insecticides, fungicides and bio-control agents including microbial or, microbial derived bio-control agents. The aqueous seaweed solution concentrate may comprise additional materials in one or more form selected from the group consisting of dispersed solids, dispersed liquids emulsions and micellar moieties Micellar moieties may be swollen.

Examples of water soluble herbicides include herbicidal acid salts including as synthetic auxin salts such as salts of one or more of 2,4-D, dicamba, MCPA, triclopyr and clopyralid, organophosphorus salt herbicides such as salts of glyphosate and glufosinate, aryphenoxypropionates (FOPS) salts, sulfonylureas salts such as salts of sulfosulfuron and imidazolinones. Such herbicides may be formulated as water soluble compositions particularly using the water soluble herbicidal salts.

Examples of water insoluble materials which may be dispersed include water insoluble esters of acid herbicides such esters of synthetic auxin herbicides, biological materials such as Bt toxins and bacterial cells or spores such as Bt cells or spores, triazine herbicides, imidacloprid insecticide.

In one set of embodiments, biological plant protection agents are mixed with the liquid seaweed concentrates. Biological plant protection agents are materials that comprise proteins and/or spores derived from biological (rather than synthetic chemical) processes. Biological plant protection agents include but are not limited to one or more of the set comprising CryA, CryB, VIP and *bacillus* proteins and/or spores. *Bacillus* spores and/or toxins may be derived from *Bacillus thuringiensis* (Bt) bacteria, such as Bt subspecies Kurstaki strain ABTS-351, Bt subspecies Kurstaki strain HD1, or from *Bacillus firmus* bacteria or other bacteria. *Bacillus* spores and/or toxins may be obtained from commercially available suspension concentrate or dry flowable formulations of biological plant protection agents such as Dipel SC or Dipel DF. For example Dipel DF can be dispersed directly into the liquid seaweed concentrate of the invention, or may be dispersed in water and the dispersion added to the liquid seaweed concentrate of the invention. Dipel SC (which carried in an oily phase) may also be directly or indirectly added into the liquid seaweed concentrate of the invention. In one embodiment a composition comprising a biological plant protection agent is dispersed in the liquid seaweed concentrate by combining from 2 to 20% by weight biological plant protection agent such as Dipel DF with liquid seaweed concentrate.

Other biological materials that can be coformulated with the liquid seaweed extract include viruses and virus-derived materials, fungi and fungal materials, nematodes and proteins. Examples of viral materials include baculoviruses that infect and kill the larvae of moths and other larvae. In one preferment the baculovirus is a nucleopolyhedrovirus (NPV) of helicoverpa larvae such as is contained in the commercial products Gemstar (distributed by Sipcam and by Certis) and Vivus Gold (distributed by AG Biotech Australia). Some of these biological materials are sold commercially as aqueous suspensions, and such suspensions can be added to preformed liquid seaweed concentrate of the invention.

The liquid seaweed concentrate may be combined with endophytes, including bacterial or fungal endophytes. Endophytes live within a plant for at least part of their life cycles without causing disease, and may act to (i) prevent colonisation of the plant by pathogenic organisms or (ii) inhibit competitor plants. A large variety of endophyte/plant synergies have been identified. Fungal endophytes may be from the phylum Ascomycota (e.g. orders Hypocreales and Hylaeales of the Pyrenomycete class). Commercially available endophytes including the following ryegrass endophytes: AR37, AR1, Endo5. Companies that provide endophytes on a commercial basis include PGG Wrightson Seeds (Australia) and Agricom. Endophytic bacteria may include bacteria that promote biological nitrogen fixation (without nodule formation) such as *Herbaspirillum seropedicae*. Other diazotrophic bacteria include *Gluconacetobacter diazotrophicus*, *H. rubrisubalbicans*, *Azospirillum amazonese* and *Burkholderia tropica*. Inoculant formulations of endophytes may be provided in polymer carriers such as carboxymethyl cellulose (CMC) solutions, and polymeric alginates contained in liquid seaweed concentrates of the invention may contribute to the stability and viability of endophytes.

In one set of embodiments the liquid seaweed concentrate composition comprising the biological plant protection agent in an amount such as from 2 to 20% by weight is applied to plants to control target insects without harming bees or beneficial insects.

The liquid seaweed solution concentrate may be applied by spraying in the concentrate form if desired, but will generally be diluted with water prior to application to plants or the locus of plants before, during or after planting. Water is used as a carrier for the solution concentrate to enable different dilutions fit for purpose and for different application methods. The solution concentrate may be used by dilution with water generally at a rate in the range of from 1 part by volume concentrate to from 4 to 1000 parts by volume of water, such as 20 to 1000 parts or 50 to 500 parts, by volume of water. In one embodiment the concentrate may be tank mixed with other agrochemicals such as one of more selected from the group consisting of fertilisers, pesticides (herbicides, fungicides and insecticides) and plant growth regulators.

The concentrate composition may also be diluted with water at a rate in the range of from 1 part solution concentrate to from 4 to 20 parts, preferably 4 to 8 parts by volume of water.

In one set of embodiments the aqueous seaweed extract in the form of a solution concentrate is prepared by a method comprising:
(a) extracting a seaweed to provide a seaweed extract concentrate comprising alginate in an amount of at least 0.5% by weight based on the weight of the extract;
(b) combining the extract with a calcium source in the presence of a calcium chelating agent and a borate compound to provide a concentrate composition as hereinbefore described containing calcium in an amount of least 0.2% by weight based on the weight of the concentrate composition.

In one set of embodiments, the liquid composition of the invention is formulated by a process involving the following steps in sequence:
(i) charging concentrated high-alginate seaweed extract liquid to a first vessel,
(ii) making up a calcium chelate pre-mix solution in a second vessel, and
(iii) slowly adding the contents of the second vessel to the first vessel, wherein the contents of the first vessel are preferably agitated while the addition takes place. The borate component will preferably be premixed with the seaweed extract in the first vessel or the chelating composition in the second vessel.

In one set of embodiments, the first vessel is charged with 80-95 parts by weight high-alginate seaweed extract having 10-25% soluble solids, and the second vessel contains 10 parts by weight of calcium chelate pre-mix which is added to the first vessel after charging with high-alginate seaweed extract.

The high-alginate seaweed extracts can be made, purchased from commercial sources or may be prepared using any of a range of methods known to the art. These include the following:

U.S. Pat. No. 2,036,922 (filed 1935, Clark and Green, "Alginic acid and process of making same") provides an improved process for making alginates of high viscosity from kelp. The improvement is to reduce hydrolytic break-down of alginic acid in processing. The process involves first leaching with cold fresh water and hydrochloric acid, chopping and then hot digesting with sufficient sodium carbonate in solution to provide a final diluted pulp of pH in the range 9-11. The digestion time is 40 minutes and heating is provided by the admission of live steam. The rough pulp is further comminuted to finely divide it, and pulp dilution and filtration then takes place.

Characterisation and QC methods discussed in the literature include: G to M ratio, molecular weight, molecular weight distribution, molecular weight stability, gel strength in various conditions of gel formation, viscosity in standard conditions, alginic acid weight percent.

U.S. Pat. No. 1,814,981 (filed 1927, Curtis and Walsh, "Process of preparing alginic acid and compounds thereof") provides an important early description of alginate production which provided a pure and stable product (note that alginic acid hydrolysis occurs in acid and in hot conditions). Raw kelp is harvested by under-water cutting and loaded into pre-leaching tanks. Pre-leaching is done at ordinary temperatures and has the objective of removing adherent sea salt. Kelp is transferred to leaching tanks which operate at 140 deg. F. Aged liquor from the leaching tanks can be used for re-leaching. After pre-leaching, kelp is drained and roughly chopped up, and in the leach tanks an aqueous solution of sodium carbonate is added. Addition of steam is used to heat the pulp. The rough pulp is ground so that the sodium carbonate has more area on which to act. The pulp issuing from the grinding mill is diluted at about 140 deg. F. with 5 times its volume of warm water, and the diluted pulp is boiled by the injection of live steam. The creamy pulp formed is pumped to storage tanks and filtered to remove cellular debris, e.g. using rotary suction filters.

CN 101445414 (filed 2008, "Formulation of seaweed gel soil conditioner and processing method thereof") teaches taking freshly harvested kelp and (i) washing with twice the weight of water with a 4-hr soak, (ii) size reduction in a colloid mill, (iii) placing in a −10 deg. C. freezer and cooling at the rate of 2-4 deg. C. per hour, thawing the complex to provide a paste and (iv) adding fertiliser salts and antioxidants and (v) packing.

WO 2012123422 (filed 2012, Susilo, "Method for processing seaweed") teaches a process with (i) removal of seaweed from the ocean, (ii) treatment with aqueous potassium hydroxide at a temperature below 50 deg. C. for not longer than 6 hours, (iii) separation of solid and liquid ingredients, (iv) processing to powder form (by spray drying or freeze drying). An optional process feature is adding potassium chloride to the potassium hydroxide liquor in the second step above.

U.S. Pat. No. 2,829,773 (filed 1955, Saddington, "Method of clarifying alginic liquor") describes methodology for removing cellular debris such as a continuous 2-stage process including flotation and sedimentation steps. Haze particles are removed using smaller-than-expected filter aid particles of vesiculated perlitic mineral.

It is generally preferred that the aqueous solution concentrate comprise a seaweed extracted under alkaline conditions such as a pH of at least 9 to such as 9 to 12.5.

In another set of embodiments there is provided a method of fertilising plants comprising:

providing a liquid seaweed extract concentrate as herein described;
optionally diluting the seaweed extract concentrate; and
applying the liquid seaweed extract to the plants or locus of the plants before, during or after planting in an amount to provide one or more benefit selected from the group consisting of enhanced plant growth, reduced plant stress and improved soil.

The composition may be used in fertilising plants by application to plants and or locus of plants. This includes application to soil, or other growth medium, before, during or after planting. Where the composition comprises herbicides, selective herbicides may be used or the composition may be applied before or during planting. Selective herbicides may be used to allow foliar spray application to a crop to control weeds within the crop. In one embodiment the composition is applied to seeds or locus of seeds at seeding. The liquid seaweed extract may, for example, be applied by soaking seed, seed coating or by application to soil proximate seed. Application to soil may take place before, during or after placement of seed. The composition is preferably applied in an amount to provide enhanced seed and or plant growth and or soil properties.

The composition may for example be applied during crop seeding, for example by application from a mechanical seeder.

The amount of composition used in each application will depend on the period between application of the composition (optionally following dilution) and the concentration of the concentrate. In one set of embodiments the rate of concentrate use is at least 1 L concentrate per hectare, preferably at least 5 L concentrate per hectare.

The concentrate composition may be used in a wide range of horticultural applications and application rates. For instance in one specific example the composition is added at a rate of about ten litres of concentrate per hectare added to as much spray water as the farmer uses for 1 hectare. In one set of embodiments the composition is applied in the range of from 1 to 10 applications per growing season. The number of applications per growing season may be chosen together with the rate of application to provide an economical increase in production of commercial crops. For example in one set of embodiments the concentrate is applied at a rate of 10 litres per hectare with about 4 applications per season. Alternatively a user may apply the concentrate at a lower rate of for example 5 L per hectare more frequently (e.g. 8 times per season).

Higher rates (10 L/ha) are particularly useful for plants coping with stress. Further, it is possible to prime plants with an initial application of the composition at lesser rates, followed by a higher rate of application.

Application methods include foliar application, irrigation, spraying, soaking, aerial, underground irrigation, chemigation, fertigation and open furrow application.

The concentrate composition may be used to improve the growth and/or condition of a wide range of plant species. Examples of typical plants on which the composition may be used include, without limitation, grapes including wine and table grapes, nuts such as almonds and macadamia, potatoes, citrus, tropical crops such as mangos, avocados, sugarcane, apples and bananas, vegetables such as carrots, onions, broccoli and garlic, fruiting plants such as tomatoes, strawberries, blueberries, other berries, cereals & broad acre crops (such as wheat, barley, canola, rice and cotton), turf and pastures plants, legume plants such as beans, soybean and clover and greenhouse crops.

The invention will now be described with reference to the following examples.

It is to be understood that the examples are provided by way of illustration of the invention and that they are in no way limiting to the scope of the invention.

EXAMPLES

The Examples of the invention are discussed with reference to the attached drawings.

COMPARATIVE EXAMPLES 1 TO 7

These comparative examples examine the use of calcium chelating agents (in the absence of borate salts) in an attempt to stabilise an aqueous liquid seaweed extract concentrate.

The seaweed extract sold under the SEASOL® brand was purchased from a commercial hardware store in Australia and had the specification shown in Table 1. The soluble solids content was increased from 15.5% by weight to 18% by weight by evaporation (this concentrate is a liquid with 82% w/w water content). The 18% w/w solids content was a solution without any precipitate.

The compositions of Comparative Examples 1 to 7 were prepared in accordance with the process in Table 2 and the resulting composition was examined for gel and or precipitate formation with the results shown in Table 2.

The chelating agents alone failed to provide the stability suitable for storage transport and handling of the seaweed extract concentrate with soluble calcium moieties.

The examples refer to a number of seaweed concentrates including the SEASOL® seaweed concentrate product.

Composition of SEASOL® Seaweed Extract (®—Trademark of SEASOL International Pty Ltd)

TABLE 1

| Component/feature | Amount | Units |
| --- | --- | --- |
| pH | 10.5 | |
| Total solids | 15.5 | % w/w |
| Specific gravity | 1.1 | Grams/ml |
| appearance | Dark brown liquid, seaweed odour | |
| filtration | 150 | microns |
| Element | | |
| nitrogen | 0.2% | w/v |
| phosphorous | 0.02% | w/v |
| potassium | 3.7% | w/v |
| boron | 15 | mg/L |
| calcium | 458 | mg/L |

TABLE 1-continued

| Component/feature | Amount | Units |
|---|---|---|
| cobalt | <0.5 | mg/L |
| copper | <0.5 | mg/L |
| iron | 115 | mg/L |
| magnesium | 972 | mg/L |
| manganese | 2 | mg/L |
| molybdenum | <0.5 | mg/L |
| selenium | <0.5 | mg/L |
| silicon | 56 | mg/L |
| sodium | 6820 | mg/L |
| sulfur | 2,574 | mg/L |
| zinc | 5 | |

TABLE 2

Comparative Example (CE) Composition and results

| CE Number | formulation | Calcium chelating Moiety | results |
|---|---|---|---|
| 1 | Start with SEASOL ® 18% soluble solids. Add 4% calcium nitrate, then add 1.5% tetrasodium EDTA | EDTA | Large gel particles formed |
| 2 | Make complex (with 1.5 parts tetrasodium EDTA, 4.5 parts calcium nitrate, 1 part fulvic acid in 5 parts water. Add 10 parts complex to (90 parts) SEASOL ® (18% soluble solids) | EDTA, fulvic acid | Layer formed at bottom of container |
| 3 | Make complex (with 8 parts HEDTA(40% soln in water) and 5 parts calcium nitrate. Add 2 parts complex to 90 parts SEASOL ® (18% soluble solids). | Hydroxyethylenediamin etriacetic acid (HEDTA) | Large gel particles formed |
| 4 | Add 10 parts calcium fulvate powder to 90 parts SEASOL ® (18% soluble solids) | Fulvic acid | Large gel particles formed |
| 5 | Into 84 parts SEASOL ® (18% soluble solids) add 1 part calcium hydroxide and 15 parts glucono delta lactone. | glucono delta lactone | Crystal precipitate |
| 6 | Make complex with 5 parts calcium nitrate, 3 parts gluconodelta lactone, 1.9 parts monoethanolamine and 4.5 parts water. Add 10 parts complex to 90 parts SEASOL ® (18% solublesolids). | glucono delta lactone | Large gel particles formed |
| 7 | Add 5 parts fulvic acid powder plus 6 parts calcium nitrate to 90 parts SEASOL ® 18% solids | Fulvic acid | Phase separation, Product not uniform |

EXAMPLE 1

Preparation of a Seaweed Extract Concentrate Composition According to the Invention The seaweed extract concentrate composition of Example 1 is prepared by making a calcium chelate pre-mix (see table entry below designated part1:calcium chelate pre-mix) and incorporating the calcium chelate pre-mix into SEASOL® liquid extract followed by mixing and pH adjustment (see Table 3 below). The calcium chelate pre-mix comprises 1) a Source of calcium, 2) a chelating moiety for calcium, 3) a boron source and 4) a pH additive.

The seaweed extract concentrate composition of Example 1 is prepared by the steps shown in Table 3 with the components and amounts specified.

TABLE 3

| | Amount Required (kg) |
|---|---|
| calcium containing liquid seaweed extract of the invention | |
| Ensure tank is clean and valve is closed. | |
| Seaweed extract with Soluble solids 18% (Part 2) | 90 kg |
| Start Stirrer | |
| Slowly add calcium chelate pre-mix (Part 1) | 13.2 kg |
| Mix for 10 minutes | |
| Test pH then add | |

TABLE 3-continued

| | Amount Required (kg) |
|---|---|
| Potassium Hydroxide | 1 kg |
| Add till pH above 10.9 to 11.4 | |
| Mix for 5 minutes after each addition | |
| Total | 104.2 kg |
| Part 1: Calcium Chelate Pre-mix | |
| Ensure tank is clean and valve is closed. | |
| Water (Heat to 40° C.) | 60 kg |
| Start Stirrer | |
| Calcium Nitrate tetrahydrate | 47 kg |
| Glucono Delta Lactone | 29 kg |

TABLE 3-continued

|  | Amount Required (kg) |
|---|---|
| Sodium tetraborate decahydrate (Borax) | 11 kg |
| Monethanolamine | 23 kg |
| Measure pH = 7.5 to 9 |  |
| Total | 170 kg |

The final composition made using the above procedure had the following composition shown in Table 4:

TABLE 4

| Item | % w/w |
|---|---|
| SEASOL ® (18% soluble solids) | 86.37 |
| Added water | 4.47 |
| Calcium nitrate tetrahydrate | 3.50 |
| Glucono delta lactone | 2.16 |
| Sodium tetraborate decahydrate (borax) | 0.82 |
| monoethanolamine | 1.71 |
| Potassium hydroxide | 0.96 |
| Total | 99.99 |

The density of the final composition was 1.14 kg per litre.

The concentration of glucono delta lactone in the final composition was 2.16% w/w, and at density 1.14 kg/L this corresponds to 2.46% w/v.

The concentration of sodium borate (as sodium tetraborate decahydrate, $Na_2B_4O_7 \cdot 10H_2O$, molecular weight 381.4) in the final composition was 0.82% w/w and at formulation density 1.14 kg/L this corresponds to 0.93% w/v. The concentration in terms of boron was $4 \times 10.8/381.4 \times 0.82 = 0.093\%$ w/w and at formulation density 1.14 kg/L this corresponds to 0.11% w/v.

The concentration of calcium nitrate tetrahydrate ($Ca(NO_3)_2 \cdot 4H_2O$, molecular weight 236.1) in the final composition was 3.50% w/w and at formulation density 1.14 kg/L this corresponds to about 4% w/v as calcium nitrate tetrahydrate. The concentration in terms of calcium was $40/236.1 \times 3.5 = 0.59\%$ w/w and at formulation density 1.14 kg/L this corresponds to 0.68% w/v.

The concentration of alginate in the final composition was about 10% w/w.

EXAMPLE 2

Preparation of a Liquid Calcium Containing Seaweed Extract Concentrate Composition According to the Invention The seaweed extract concentrate of Example 2 is prepared using the procedure and amounts of components shown in Table 5 below.

TABLE 5

|  | Amount Required (kg) |
|---|---|
| Calcium containing liquid seaweed concentrate of the invention |  |
| Ensure tank is clean and valve is closed. |  |
| SEASOL ® (Soluble solids 18%) (Part 2) | 90 kg |
| Start Stirrer |  |

TABLE 5-continued

|  | Amount Required (kg) |
|---|---|
| Slowly add calcium chelate pre-mix (PART 1) | 13.7 kg |
| Mix for 10 minutes |  |
| Test pH then add |  |
| Potassium Hydroxide | 1 kg |
| Add till pH above 10.9 to 11.4 |  |
| Mix for 5 minutes after each addition |  |
| Total | 104.7 kg |
| Part 1: Calcium Chelate Premix |  |
| Ensure tank is clean and valve is closed. |  |
| Water (Heat to 40° C.) | 60 kg |
| Start Stirrer |  |
| Calcium Nitrate tetrahydrate | 50 kg |
| Glucono Delta Lactone | 29 kg |
| Sodium Borate (Borax, tetrasodium borate decahydrate) | 11 kg |
| Potassium Hydroxide | 6 kg |
| Measure pH = 7.5 to 9 |  |
| Total | 156 kg |

The final composition of Example 2 made using the above procedure had the following composition shown in Table 6:

TABLE 6

| Item | % w/w |
|---|---|
| SEASOL ® (18% soluble solids) | 85.96 |
| Added water | 5.03 |
| Calcium nitrate tetrahydrate | 4.19 |
| Glucono Delta lactone | 2.43 |
| Sodium borate | 0.92 |
| Potassium hydroxide | 1.5 |
| Total | 100.03 |

The density of the final composition was 1.14 kg per litre.

The concentration of glucono delta lactone in the final composition was 2.43% w/w, and at density 1.14 kg/L this corresponds to 2.77% w/v.

The concentration of sodium borate (as sodium tetraborate decahydrate, $Na_2B_4O_7 \cdot 10H_2O$, molec weight 381.4) in the final composition was 0.92% w/w and at composition density 1.14 kg/L this corresponds to 1.05% w/v. The concentration in terms of boron was $4 \times 10.8/381.4 \times 0.92 = 0.10\%$ w/w and at formulation density 1.14 kg/L this corresponds to 0.12% w/v.

The concentration of calcium nitrate tetrahydrate ($Ca(NO_3)_2 \cdot 4H_2O$, molec weight 236.1) in the final composition was 4.19% w/w and at formulation density 1.14 kg/L this corresponds to 4.78% w/v. The concentration in terms of calcium was $40/236.1 \times 4.19 = 0.71\%$ w/w and at formulation density 1.14 kg/L this corresponds to 0.81% w/v.

The concentration of alginate in the final composition was 10% w/w.

EXAMPLE 3

Preparation of a Calcium Containing Liquid Seaweed Extract Concentrate Composition According to the Invention The seaweed extract composition of Example 3, in which sodium gluconate is the calcium chelator, is prepared by the general process described in Example 1 and detailed in Table 7 using the components in the amounts specified.

TABLE 7

| | Amount Required (kg) |
|---|---|
| Calcium containing liquid seaweed concentrate of the invention | |
| Ensure tank is clean and valve is closed. | |
| Seaweed extract with Soluble solids 18% (Part 2) | 90 kg |
| Start Stirrer | |
| Slowly add calcium chelate pre-mix (PART 1) | 13.4 kg |
| Mix for 10 minutes | |
| Test pH then add | |
| Potassium Hydroxide | 1 kg |
| Add till pH above 10.9 to 11.4 | |
| Mix for 5 minutes after each addition | |
| Total | 104.4 kg |
| Part 1: Calcium Chelate Pre-mix | |
| Ensure tank is clean and valve is closed. | |
| Water (Heat to 40° C.) | 60 kg |
| Start Stirrer | |
| Calcium Nitrate tetrahydrate | 47 kg |
| Sodium gluconate | 29 kg |
| Sodium tetraborate decahydrate (Borax) | 10.9 kg |
| Monethanolamine | 3.5 kg |
| Measure pH = 7.5 to 9 | |
| Total | 150.4 kg |

EXAMPLE 4

Evaluation of Composition Described in Example 2

The size and number of gel particles was estimated by using a Dino-Lite Handheld Digital Camera inserted in a Microscope in conjunction with DinoCapture 2 software from AnMo Electronics Corporation. A sample of the seaweed concentrate composition of Example 2 was placed on a microscope slide under a cover slip and the Dino digital was fitted into microscope. After image focussing, a photo was taken and captured on the software (which carried out further analysis). The sieve test was conducted by running 100 ml of concentrate through a sieve and drying and weighing the residue. The results are shown in Table 8.

Protocols for Particle Size, Average No of Particles, Sieve Test

TABLE 8

| | Typical gel particle size (mm) | Av no of gel particles per sq 0.1 mm × 0.1 mm | Sieve test 53 microns. |
|---|---|---|---|
| Example 2 | 0.009 | 10 | 0.16% |

The Comparative Examples 1 to 7 contained very significant gelation with relatively large particles (or phase separation) which would render the product difficult or impossible to apply with farm spray equipment whereas the composition of the invention contained insignificant levels of particulates of size which would not interfere with normal spray application. Also the presence of significant particles reduces the bioavailablility of the calcium alginate component which is bound in gel form.

EXAMPLE 5

This example demonstrates the invention using a variety of six distinct borate compounds. These six distinct borate compounds were:

1. Trimethyl borate—CAS 121-43-7, (purchased from Sigma-Aldrich Australia), purity>99%, chemical formula B(OCH3)3, mole weight 103.91 g.
2. Triisopropyl borate—CAS 5419-55-6 (purchased from Sigma-Aldrich Australia), purity>98%, chemical formula B((CH3)2CHO)3, mole weight 188.07 g.
3. Sodium Perborate tetrahydrate CAS 10486-00-7 (purchased from Acros Chemicals, Australia), dimer (divalent) anion B2O4(OH)4, 2 boron atoms joined by 2 peroxo bridges, average composition NaBO3.4H2O.
4. Boric acid, chemical composition B(OH)3, mole weight 61.8 g.
5. Borax, (sodium borate, sodium tetraborate, disodium tetraborate, sodium tetraborate decahydrate), chemical formula Na2B4O7.10H2O, molar mass 381.38 (decahydrate) 201.22 (anhydrate).
6. Borax (sodium tetraborate pentahydrate, chemical formula Na2B4O7.5H2O.

Six different calcium chelate pre-mixes were made by mixing the components shown in Table 9:

TABLE 9

| Part 1: Calcium chelate pre-mix | parts |
|---|---|
| Ensure tank is clean and valve is closed. | |
| Water (Heat to 40° C.) | 60 |
| Start Stirrer | |
| Calcium nitrate tetrahydrate salt | 47 |
| Glucono Delta Lactone | 29 |
| Borate compound | 11 |
| Monethanolamine | 23 |
| Measure pH = 7.5 to 9 | |
| Total | 170 |

The six calcium chelate pre-mixes were designated trimethyl borate pre-mix, triisopropyl borate pre-mix, sodium perborate tetrahydrate pre-mix, boric acid pre-mix, borax decahydrate pre-mix and borax pentahydrate pre-mix.

Six different formulations of the invention were made by adding 14 parts of calcium chelate pre-mix (6 variations as discussed above) to 86 parts seaweed extract (SEASOL®, 18% solids).

Composition details for these six formulations are provided in table 10 below:

TABLE 10

| Procedure | Trimethyl borate Parts by weight | Triisopropyl borate Parts by weight | Sodium perborate tetrahydrate Parts by weight | Boric acid Parts by weight | Borax decahydrate Parts by weight | Borax pentahydrate Parts by weight |
|---|---|---|---|---|---|---|
| (i) Add SEASOL®, 18% solids | 86 | 86 | 86 | 86 | 86 | 86 |
| (ii) Add calcium chelate pre-mix | 14 | 14 | 14 | 14 | 14 | 14 |
| Percentage of final boron contain Compound content (Percantage Boron equivalent) | 0.74 (0.08 as boron) | 0.74 (0.04 as boron) | 0.74 (0.10 as boron) | 0.95 (0.17 as boron) | 0.99 (0.11 as boron) | 0.73 (0.108 as boron) |

The formulations shown in Table 10 were examined as follows: The size and number of gel particles was estimated using a Dino-Lite Handheld Digital Camera inserted in a Microscope in conjunction with DinoCapture 2 software from AnMo Electronics Corporation (see Example 4). Results are shown in Table 11.

TABLE 11

| parameter | Trimethyl borate formulation | Triisopropyl borate formulation | Sodium perborate tetrahydrate formulation | Boric acid formulation | Borax Decahydrate formulation | Borax pentahydrate formulation |
|---|---|---|---|---|---|---|
| Average gel particle size (mm) | 0.009 | 0.014 | 0.0114 | 0.0443 | 0.0058 | 0.0045 |
| Standard deviation | 0.0056 | 0.0118 | 0.0088 | 0.0237 | 0.0046 | 0.002 |
| Average no. of gel particles per sq 0.1 mm × 0.1 mm | 120 | 188 | 192 | 184 | 78 | 48 |

Discussion

Based on gel particle size (smaller the better) and particle number (fewer the better), boron as borax (pentahydrate form) gave the best formulation and boric acid gave the worst formulation. Other boron moieties were significantly better than boric acid.

EXAMPLE 6

The following example explores the effect of increasing the calcium concentration (as calcium nitrate tetrahydrate) in formulations of the invention. Calcium-induced precipitation is the key problem addressed by the instant invention, and increasing calcium represents increasing likelihood of instability (associated with the formation of large and/or numerous gel particles).

Four calcium chelate pre-mixes C1, C2, C3 and C4 with varying quantities of calcium (added as calcium nitrate tetrahydrate) were prepared as provided in Table 12.

TABLE 12

| component | C1 Parts by weight | C2 Parts by weight | C3 Parts by weight | C4 Parts by weight |
|---|---|---|---|---|
| water | 75 | 50 | 40 | 36 |
| Calcium nitrate tetrahydrate | 35 | 60 | 70 | 80 |
| Gluconodelta lactone | 29 | 29 | 29 | 23 |
| Borax (pentahydrate) | 8.74 | 8.74 | 8.74 | 8.74 |
| Potassium hydroxide monoethanolamine | 10 | 10 | 10 | 10 |
| Total | 157.74 | 157.74 | 157.74 | 157.74 |
| Percent (rounded) calcium when calcium chelate (14 parts) is added to SEASOL® (18% solids) 86 parts | 0.5% | 0.9% | 1.1% | 1.2% |

Four formulations of the invention were made by taking 86 parts SEASOL® (18% solids) and stirring in 14 parts of the above four calcium chelate pre-mixes C1, C2, C3, C4. These 4 formulations of the invention were designated FC1, FC2, FC3 and FC4 respectively.

The formulations FC1, FC2, FC3 and FC4 were examined as follows: The size and number of gel particles was estimated using a Dino-Lite Handheld Digital Camera inserted in a Microscope in conjunction with DinoCapture 2 software from AnMo Electronics Corporation (see Example 4). Results are shown in Table 13.

TABLE 13

| parameter | FC1 | FC2 | FC3 | FC4 |
|---|---|---|---|---|
| Average gel particle size (mm) | 0.0054 | 0.011 | 0.052 | 0.044 |
| Standard deviation | 0.0051 | 0.005 | 0.044 | 0.038 |

Discussion

The above formulations were passed through a 53 micron sieve, and it was observed that the quantity of residue on the sieve was greater for FC3 than for FC1 and FC2, and the quantity of residue for FC4 was significantly greater than for FC3. Gel particle size tends to increase with increasing calcium. The size increase is greatest when the calcium content is between 0.9% and 1.1%. This preferred calcium concentration range level will vary depending on borate loading.

Note that in the above experiment, the best (small) gel particle sizes are encountered when the ratio of gluconodeltalactone (GDL) to calcium (as calcium nitrate tetrahydrate is greater than around 2.5, and preferably greater than 3. These results are substantiated in Table 14:

Calcium ion concentration based on the fact that in the calcium nitrate used, calcium comprises 17% of weight.

So if there are 35 parts calcium nitrate in a total formulation weight of 157.74 parts (see Table 14 below for formulation with 0.52% calcium, rounded to 0.5%), the percent calcium in the formulation is 3.77%=(35×0.17/157.74).

If there are 29 parts GDL in 157.74 parts total formulation, the percent GDL in the formulation is 18.38=29×100/157.74

In this scenario, the ratio of GDL to calcium is 18.38/3.77=4.9 (approx).

TABLE 14

| Formulation character | F0.5% Cal | F0.9% Cal | F1.1% Cal | F1.2% Cal |
|---|---|---|---|---|
| Water | 75 | 50 | 40 | 36 |
| Calcium Nitrate | 35 | 60 | 70 | 80 |
| Gluco Delta lactone | 29 | 29 | 29 | 23 |

TABLE 14-continued

| Formulation character | F0.5% Cal | F0.9% Cal | F1.1% Cal | F1.2% Cal |
|---|---|---|---|---|
| Monethanolamine | 10 | 10 | 10 | 10 |
| Sodium Borate Pentahydrate | 8.74 | 8.74 | 8.74 | 8.74 |
| Total mass | 157.74 | 157.74 | 157.74 | 157.74 |
| Calcium Ion Concentration % | 3.77 | 6.5 | 7.54 | 8.62 |
| GDL mass % | 18.38 | 18.38 | 18.38 | 14.58 |
| Ratio GDL/Ca | 4.9 | 2.8 | 2.4 | 1.7 |
| Particle Size Mean | 0.005 | 0.011 | 0.052 | 0.044 |
| Median size | 0.0038 | 0.0101 | 0.036 | 0.0331 |

Figure 1:
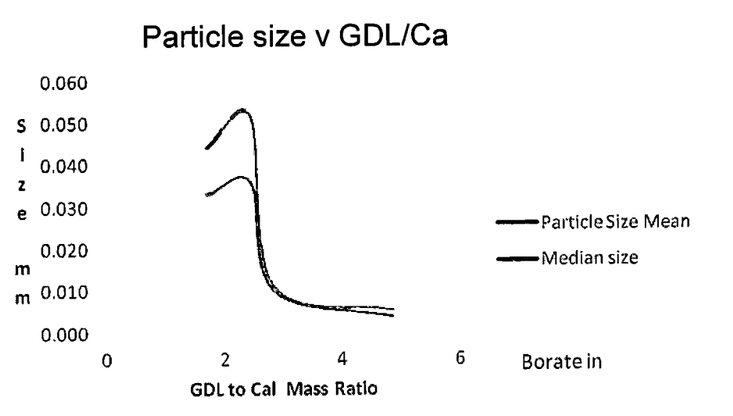
FIG. 1 is a graph of the variation in gel particle size formed within the borate containing composition of the invention with the ratio of gluconodeltalactone (GDL)/calcium ion. The upper plot shows mean particle size and the lower plot shows the median particle size.

The variation of particle size with the ratio of gluconodeltalactone (GDL) to calcium ion is shown in FIG. 1.

The above formulations FC1, FC2, FC3, FC4 were re-made by withholding borate components from the above-noted calcium chelate pre-mixes, and by adding the withheld borate material to the SEASOL® (18% solids). This addition took place before the final step where calcium chelate pre-mix (14 parts) was added to SEASOL® (18% solids) (84 parts). It was found that the variation of gel particle size with calcium was substantially the same.

EXAMPLE 7

In this example various calcium compounds were examined for use as a source of calcium ions used in the compositions of the invention. The water solubility of calcium salts examined is provided in Table 15.

TABLE 15

| Calcium salt | % Calcium | Mean molecular weight | Solubility in water |
|---|---|---|---|
| Calcium Chloride dihydrate | 37% | 147.02 | >80 g/100 ml |
| Calcium hydroxide | 54% | Ca(OH)2 74.093 g/mol | 0.173 g/100 mL (20° C. |
| Calcium citrate tribasic | 24% | 498.4334 g/mol (anhydrous) | 0.085 g/100 mL (18° C.) 0.095 g/100 mL (25 |
| Calcium gluconate | 9% | 448.4 g/mol | Needs heat to dissolve in water 3.5% in cold water |
| Calcium Fulvate | 7% | Polymer | 30% soluble in water |
| Calcium Carbonate | 40% | 100 g/mol | Almost insoluble in water |
| Calcium nitrate tetrahydrate | 17% | 236.15 g/mol | >80 g/100 ml |

Four calcium chelate pre-mixes were made by utilising the four water soluble calcium salts: calcium nitrate, calcium chloride, calcium gluconate and calcium fulvate. These calcium chelate pre-mixes were designated nitrate, chloride, gluconate and fulvate pre-mixes respectively. The components used in preparing compositions of the four calcium chelate pre-mixes are shown in Table 16.1 to 16.4:

TABLE 16.1

| Nitrate Calcium chelate pre-mix | parts |
|---|---|
| Ensure tank is clean and valve is closed. Water (Heat to 40° C.) | 60 |
| Start Stirrer | |
| Calcium Nitrate tetrahydrate | 47 |
| Glucono Delta Lactone | 29 |
| Sodium tetraborate decahydrate (Borax) | 11 |
| Monethanolamine | 23 |
| Measure pH = 7.5 to 9 | |
| Total | 170 |

TABLE 16.2

| Chloride Calcium chelate pre-mix | parts |
|---|---|
| Ensure tank is clean and valve is closed. Water (Heat to 40° C.) | 60 |
| Start Stirrer | |
| Calcium chloride | 50 |
| Glucono Delta Lactone | 29 |
| Sodium tetraborate pentahydrate (Borax) | 8.74 |
| Monethanolamine | 10 |
| Measure pH = 7.5 to 9 | |
| Total | 157.74 |

TABLE 16.3

| Gluconate Calcium chelate pre-mix | parts |
|---|---|
| Ensure tank is clean and valve is closed. Water (Heat to 40° C.) | 60 |
| Start Stirrer | |
| Calcium gluconate | 79 |
| Sodium tetraborate pentahydrate (Borax) | 10 |
| Monethanolamine | 6 |
| water | 10 |
| Measure pH = 7.5 to 9 | |
| Total | 165 |

TABLE 16.4

| Fulvate Calcium chelate pre-mix | parts |
|---|---|
| Ensure tank is clean and valve is closed. Water (Heat to 40° C.) | 50 |
| Start Stirrer | |
| Calcium nitrate | 60 |
| Potassium Fulvate | 30 |
| Sodium tetraborate pentahydrate (Borax) | 8.75 |
| Monethanolamine | 5 |
| Measure pH = 7.5 to 9 | |
| Total | 153.75 |

The nitrate, chloride and fulvate calcium chelate pre-mixes were added at 10 parts to 90 parts of SEASOL (18% solids), and these formulations shown in Table 17 were examined.

The size of gel particles was estimated using a Dino-Lite Handheld Digital Camera inserted in a Microscope in conjunction with DinoCapture 2 software from AnMo Electronics Corporation (see Example 4). Results were as follows:

TABLE 17

| parameter | nitrate | fulvate | chloride |
|---|---|---|---|
| Mean size (mm) | 0.011 | 0.025 | 0.016 |
| Std (mm) | 0.011 | 0.028 | 0.015 |

The calcium gluconate complex was heated for a period of about one hour at 50° C. to it render soluble and when this complex (10 parts) was added to SEASOL® (18% solids) 90 parts, a clear solution was found with very few gel particles.

EXAMPLE 8

The following phosphate salts were included in a liquid seaweed plus calcium formulation of the invention:

Monoammonium phosphate (MAP), chemical formula NH4H2PO4, mole weight 115 g, water solubility (20 deg C.) 404 g/L, phosphorous 27%.

Monopotassium phosphate (MKP), chemical formula KH2PO4, mole weight 136.1 g, water solubility (20 deg C.) 226 g/L, phosphorous 23%.

Sodium triphosphate (STP equals STPP for sodium tripolyphosphate), chemical formula Na5P3O10, mole weight 367.9 g, water solubility (25 deg C.) 145 g/L, phosphorous 25%.

Four different formulations of the invention were made by the following 4-step procedure:
(i) Seaweed extract (18% solids),
(ii) calcium chelate pre-mix,
(iii) phosphate moiety, and
(iv) optional pH adjustment.

The four formulations were designated MAP (low pH), MAP (high pH), MKP, and STP.

The SEASOL® 18% solids composition was obtained by evaporation of the product shown in Table 1 to obtain 18% w/w solids content as described in Comparative Example 1.

The calcium chelate premix used was as shown in Table 3 (Part 1).

Formulation details are provided in Table 18 below.

TABLE 18

| Procedure | MAP (low pH) Parts by weight | MAP (high pH) Parts by weight | MKP Parts by weight | STP Parts by weight |
| --- | --- | --- | --- | --- |
| (i) Add Seasol, 18% solids | 81.8 | 81.8 | 80.4 | 82.0 |
| (ii) Add calcium complex | 14 | 14 | 14 | 14 |
| (iii) add phosphorous moiety | | | | |
| MAP | 4.25 | 4.25 | — | — |
| MKP | — | — | 5.64 | — |
| STP | — | — | — | 4 |
| Phosphorous (%) | 0.9% | 0.9% | 1.2% | 1.0% |
| (iv) pH adjustment | No pH adjustment, final pH equals 8.08, final composition comprises 4.25 parts MAP | pH adjusted up by KOH, final pH equals 10.56 final composition comprises 4.25 parts MAP | pH adjusted up by KOH, final pH equals 10.5 final composition comprises 5.64 parts MKP | No pH adjustment, final pH equals 10.5, final composition comprises 4 parts STP |

The formulations shown in Table 18 were examined as follows: The size and number of gel particles was estimated using a Dino-Lite Handheld Digital Camera inserted in a Microscope in conjunction with DinoCapture 2 software from AnMo Electronics Corporation (see Example 4). Results were as follows:

TABLE 19

| parameter | MAP low pH | MAP high pH | MKP | STP |
| --- | --- | --- | --- | --- |
| Average gel particle size (mm) | .023 | .011 | .0099 | .054 |
| Standard deviation | .009 | .006 | .0088 | .033 |
| Average no. of gel particles per sq. 0.1 mm × 0.1 mm | 144 | 46 | 48 unstable with crystals | 108 |

Based on low gel particle size and high formulation stability, the optimal phosphorous-containing formulation was achieved by adding MAP to the SEASOL® 18% plus calcium chelate pre-mix liquors, and by taking the final pH to the range 9-11.5.

EXAMPLE 9

This Example demonstrated preparation of compositions of the invention with a variety of sources of seaweed.

The following seaweed extracts were obtained and/or formulated:

SWE1—Seaweed extract powder (manufacturer Acadian Seaplants) was obtained and dissolved at 18% solids in water, with pH adjustment to 10.5 with potassium hydroxide.

SWE2—Seaweed liquid concentrate (Stimplex®, a liquid, 19.5% solids) Ascophyllium nodosum seaweed concentrate sold by Acadian. This was obtained and taken to pH 10.5 with potassium hydroxide.

Formulations according to the invention (FSWE1 and FSWE2 respectively) were made by mixing the nitrate calcium chelate premix of Table 3 (Part 1)(10 parts) to seaweed extracts SWE1 and SWE2 respectively.

The size of gel particles was estimated using a Dino-Lite Handheld Digital Camera inserted in a Microscope in conjunction with DinoCapture 2 software from AnMo Electronics Corporation (see Example 4). Results are shown in Table 20:

TABLE 20

| parameter | FSWE1 | FSWE2 |
| --- | --- | --- |
| Mean size (mm) | 0.0069 | 0.0051 |
| Std (mm) | 0.0063 | 0.0047 |

EXAMPLE 10

This example examines the effect of increasing the borate concentration (as borax pentahydrate) in formulations of the invention.

Four calcium chelate pre-mixes with different quantities of borax (as pentahydrate) were prepared as provided in Table 21.

TABLE 21

| component | 3 parts borate in calcium chelate pre-mix Parts by weight | 5 parts borate in calcium chelate pre-mix Parts by weight | 7 parts borate in calcium chelate pre-mix Parts by weight | 10.9 parts borate in calcium chelate pre-mix Parts by weight |
|---|---|---|---|---|
| water | 60 | 60 | 60 | 60 |
| Calcium nitrate tetrahydrate | 50 | 50 | 50 | 50 |
| Gluconodelta lactone | 29 | 29 | 29 | 29 |
| Borax (pentahydrate) | 3 | 5 | 7 | 10.9 |
| Potassium hydroxide | 0 | 0 | 0 | 0 |
| monoethanolamine | 7 | 7 | 7 | 6 |

Four formulations of the invention were made by taking 86 parts SEASOL® (18% solids) and stirring in 14 parts of the above four calcium chelate pre-mixes. These four formulations of the invention were designated F3, F5, F7 and F10.9 respectively.

The formulations F3, F5, F7 and F10.9 were examined as follows: The size and number of gel particles was estimated using a Dino-Lite Handheld Digital Camera inserted in a Microscope in conjunction with DinoCapture 2 software from AnMo Electronics Corporation (see Example 4). Results are shown in Table 22:

TABLE 22

| parameter | F3 | F5 | F7 | F10.9 |
|---|---|---|---|---|
| Average gel particle size (mm) | 0.068 | 0.021 | 0.0086 | 0.007 |
| Standard deviation | 0.063 | 0.016 | 0.0036 | 0.006 |

Discussion

There is a consistent trend to lower gel particle sizes when higher borate levels are used.

EXAMPLE 11

In this example the chelating agent potassium fulvate was included by mixing the following components in the parts by weight specified in Table 23:

TABLE 23

| Fulvic Calcium Chelate pre-mix | parts |
|---|---|
| Ensure tank is clean and valve is closed. | |
| Water (Heat to 40° C.) | 70 |
| Start Stirrer | |
| Calcium nitrate tetrahydrate | 40 |
| Potassium fulvate | 30 |
| Sodium perborate decahydrate | 10 |
| Monethanolamine | 5 |
| Measure pH = 7.5 to 9 | |

14 Parts Fulvic calcium chelate pre-mix mixed with 86 parts Seasol (18% solids), and potassium hydroxide was used to achieve a pH of between 10.5 and 11.0. The final formulation was designated FFA.

The size of gel particles was estimated using a Dino-Lite Handheld Digital Camera inserted in a Microscope in conjunction with DinoCapture 2 software from AnMo Electronics Corporation (see Example 4). Results were as follows:

| parameter | FFA |
|---|---|
| Mean size (mm) | 0.011 |
| Std (mm) | 0.011 |

EXAMPLE 12

Bioefficacy Data

Bioefficacy was measured in terms of root growth when (i) seedlings were immersed in Commercial SEASOL® concentrate of the composition of Table 1 (1/400 dilution in water), and compared with (ii) seedlings immersed in Calcium containing liquid seaweed concentrate of the invention (in Table 10 using the Borax pentahydrate formulation and process) (1/400 dilution in water).

The greenhouse conditions for the comparison were: 22-25 deg. C. at 60% relative humidity and using Capsicum seedlings with trimmed roots and grown for a 14 day duration at which point the roots were harvested, dried and their weight measured.

The following percent root weight gains were found when Calcium containing liquid seaweed concentrate of the invention was added to water according to the above protocol: capsicum seedlings in the treatment with Calcium containing liquid seaweed concentrate of the invention had 48% greater dry root weight relative to capsicum seedlings treated with commercial SEASOL® concentrate.

| Treatment | Dried weight of roots (g) average |
|---|---|
| SEASOL® | 0.074 |
| SEASOL® + Ca | 0.110 |

The increase in the dried weight of roots in the presence of the stable calcium liquid seaweed concentrate of the invention represents a significant improvement in the enhanced growth.

The invention claimed is:

1. An aqueous concentrate composition comprising:
 (a) aqueous liquid seaweed extract formed by aqueous solvent extraction of seaweed and comprising dissolved solids extracted from the seaweed including soluble alginate, wherein the aqueous concentrate composition comprises 5% to 25% by weight soluble alginate based on the weight of the concentrate composition;
 (b) 0.1% to 5% calcium by weight based on the weight of the concentrate composition;
 (c) a calcium chelating agent selected from gluconodeltalactone and gluconic acid, or water soluble salt thereof, in the range of from 0.3% to 5% by weight based on the weight of the concentrate composition;
 (d) borate (as boron equivalent) in an amount in the range of from 0.02% to 5% by weight based on the weight of the concentrate composition; and
 (e) water in an amount of from 60% to 95% w/w of the concentrate composition,
 wherein the borate and calcium chelating agent inhibit formation of calcium alginate precipitate which would otherwise occur from combination of calcium and the aqueous liquid seaweed extract.

2. The aqueous concentrate according to claim 1, wherein the weight ratio of borate (as boron equivalent) to calcium is in the range of from 1:1 to 1:25.

3. The aqueous concentrate according to claim 1, wherein calcium chelating agent is present in an amount in the range of from 0.5% to 5% by weight based on the weight of the concentrate composition.

4. The aqueous concentrate according to claim 1, wherein the molar ratio of chelating agent:calcium is in the range of from 12:1 to 1:4.

5. The aqueous concentrate according to claim 1, comprising at least 70% w/w water.

6. The aqueous concentrate according to claim 1, wherein the composition comprises no more than 90% w/w water.

7. The aqueous concentrate according to claim 1, wherein the calcium is in the form of a calcium salt comprising at least one selected from the group consisting of calcium nitrate, calcium chloride, calcium fulvate and calcium gluconate.

8. The aqueous concentrate according to claim 1, wherein the pH of the solution concentrate is in the range of from 7 to 12.5.

9. The aqueous concentrate according to claim 1, further comprising one or more additional materials selected from the group consisting of plant nutrients, pesticides, plant safeners, plant defence elicitors, soil enhancers, microbial nutrients, and beneficial biologicals or parts thereof.

10. The aqueous concentrate according to claim 1, further comprising a biological plant protection agent selected from the group consisting of *Bacillus thuringiensis; Bacillus firmus*; the proteins, spores and toxins of at least one of *Bacillus thuringiensis* and *Bacillus firmus*; baculovirus; and endophytes.

11. The aqueous concentrate according to claim 1, comprising the chelating agent gluconodeltalactone (GDL) and wherein the weight ratio of GDL to calcium ion is at least 2.

12. The aqueous concentrate according to claim 1, wherein the borate compound comprises at least one selected from the group consisting of trialkyl borates, perborates, borax decahydrate, borax pentahydrate and boric acid.

13. The aqueous concentrate according to claim 1, wherein the boron compound is hydrated borax.

14. The aqueous concentrate according to claim 1, wherein the composition further comprises one or more phosphorous compounds.

15. A method of preparing an aqueous solution concentrate comprising:
   (a) extracting a seaweed to provide an aqueous liquid seaweed extract comprising alginate in an amount of 5% to 25% w/w, of the concentrate composition;
   (b) combining the extract with a calcium source in the presence of a calcium chelating agent selected from gluconodeltalactone and gluconic acid, or water soluble salt thereof, and a borate compound to provide 0.1% to 5% w/w calcium, 0.3% to 5% w/w calcium chelating agent, and 0.02% to 5% w/w borate (as boron equivalent), and water in an amount of 60% to 95% w/w, of the concentrate composition, and thereby provide an aqueous concentrate composition according to claim 1.

16. A method of enhancing plant growth comprising:
   (a) providing an aqueous concentrate composition according to claim 1;
   (b) optionally diluting the aqueous concentrate composition; and
   (c) applying the aqueous concentrate composition to plants or a locus of the plants before, during or after planting in an amount to provide one or more benefit selected from the group consisting of improved plant vigour, enhanced plant growth, reduced plant stress and improved soil.

* * * * *